June 29, 1926.

P. C. GROVER

WHEEL PULLER

Filed Oct. 16, 1924

1,590,973

Inventor
PERCY C. GROVER

By
Attorney

Patented June 29, 1926.

1,590,973

UNITED STATES PATENT OFFICE.

PERCY C. GROVER, OF BIRMINGHAM, ALABAMA.

WHEEL PULLER.

Application filed October 16, 1924. Serial No. 743,865.

My invention relates to a device for pulling wheels and the like from their axle or shaft supports, and is more particularly intended to improve and perfect the pulling device which forms the subject matter of my pending application No. 671,276.

In the actual use of my application as embodied in my application aforesaid, it was found desirable not to have the threads in the hub engaging caps to fit too closely on the threads on the hub as the latter were often worn or somewhat deformed, but when the cap threads were designed for a loose fit it was found that if the wheel was stuck tight the threads would often strip.

The chief object of my present invention is to provide the threaded puller elements which engage the wheel hub so designed that they will fit loosely on the threaded hubs and can thus be easily run on notwithstanding much wear and defacement of the hub threads, such threaded elements being made contractable and so arranged in relation to the pulling device that as the pull is applied they are contracted and caused to bind the more tightly the greater the pull.

My invention contemplates broadly the provision of a holder for interchangeable split screw rings which are adapted to engage the wheel hubs, said rings and their holder having co-acting wedge faces which will compress the rings as the pull is exerted.

It is a further distinctive feature of my invention that in providing the split threaded rings of different internal diameter but of constant external diameter I can very cheaply provide the necessary interchangeable parts to adapt the appliance of all ordinary sized wheel hubs.

My invention further comprises the novel details of construction and arrangements of parts, which in their preferred embodiment only are illustrated in the accompanying drawings which form a part of this specification, and in which:—

Similar reference numerals refer to similar parts throughout the drawings.

In the embodiment of my invention illustrated, I show the device as adapted more particularly for the pulling of wheels from their axles, though it is to be understood that my invention contemplates the adaptation of its parts to the pulling of any element from the support on which it is mounted. I show a wheel 1 having a hub 2 with a threaded outer end 3 which receives the hub cap not shown. The hub is mounted fast on a taper axle 4 which at its outer end is reduced and threaded to receive the hub retaining nuts which are not shown. The parts as thus far described are typical of any wheel.

Figure 1:
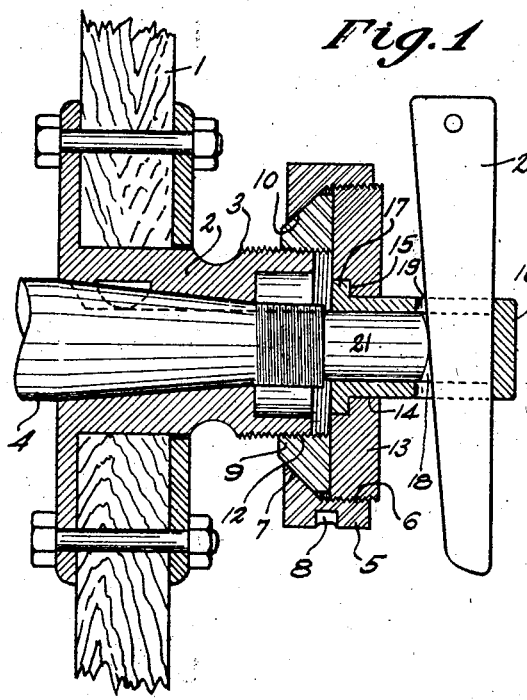
Fig. 1 illustrates my invention in vertical cross section in the act of pulling a wheel, also shown in cross section its axle which is shown in elevation.
Figure 2:
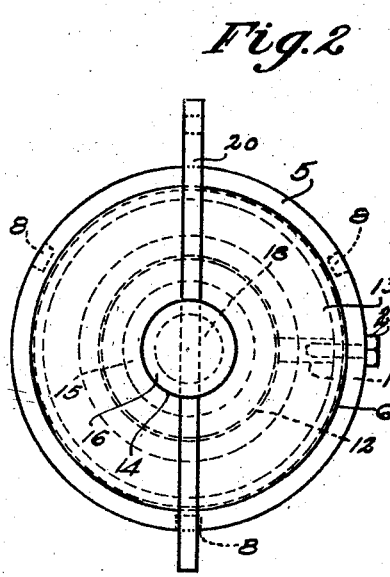
Fig. 2 is an end view of the assembled device.
Figures 3, 4, 5:
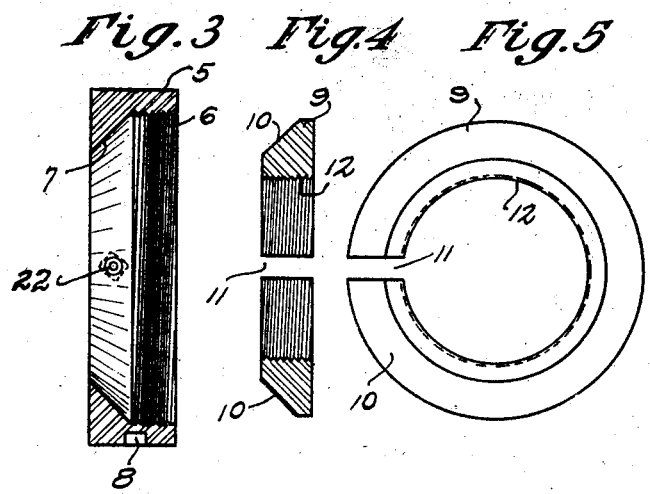
Figs. 3, 4, 5 and 6 are detail views respectively of the nut in cross section, the interchangeable split ring screw in cross section and front elevation, and the screw retainer in side elevation.
Figure 6:
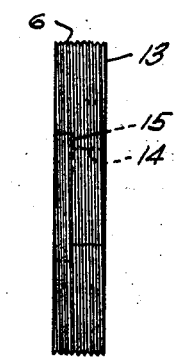

The puller mechanism proper comprises a sleeve 5 having an internal threaded portion 6 of constant diameter extending inwardly to a bevelled annular shoulder 7 of reduced diameter formed on the end of the sleeve which is disposed toward the work. The sleeve is knurled or provided with spanner wrench holes 8 which are typical of any tool grip. I mount in the sleeve an interchangeable and replaceable screw ring 9 which has a taper face 10 corresponding to the taper of the shoulder 7 and adapted to engage the same. The screw ring is split as shown at 11 in Fig. 5 and with each device I provide a set of these screw rings having constant external diameters and similar bevelled faces 10 but having their internal diameters varying to fit the different sized threaded ends 3 of wheel hubs. The screw rings 9 are provided with internal threads 12 which are adapted to screw loosely onto the hub end 3 or the work to be pulled. Preferably the screw ring is dropped loosely onto the bevelled shoulder 7 and is held in place by a heavy retainer ring 13 which is screwed down into the sleeve by engagement with the threads 6 therein. This ring 13 has a center hole 14 which merges at its inner end into an offset recess 15 and I insert through the hole 14 a plunger guide 16 having at its inner end a flange 17 fitting flush into the recess 15 in the ring 13. The plunger guide projects substantially beyond the ring 13 and has a bore 18 opening through its inner end and opposite side slots 19 through which a wedge 20 is adapted to be driven. The nontapering edge of the wedge is adapted to seat against the outer end of the guide which provides a flat wedge seat extending the full diameter of the guide. The inner tapering edge of the wedge is adapted to engage the outer bevelled end of a plunger 21 which when forced inwardly by the wedge will engage the end of the axle so that as the wedge is driven through the plunger guide, the latter is forced outwardly carrying with it the ring 13, the nut 5 and the screw ring 9 and thus pulling off the wheel. It is important to note that the screw ring 9 is threaded to form a loose free fit on the threaded end 3 of the hub so that it can be applied notwithstanding considerable wear or deformation on the hub threads. However, as the pull begins to take effect, the wedging action between the surfaces 7 and 10 acts to contract the split ring 9, causing it to bind more and more tightly in its threaded engagement on the hub and thus providing a grip of increasing power proportioned to the resistance of the wheel to being pulled off. The light, relatively inexpensive, split ring 9 can be interchanged to fit the device to the desired work. The full bearing given the non-taper face of the wedge and the point bearing between the taper face of the wedge and the plunger is a more satisfactory arrangement than in my earlier application, as there will be no tendency to cock the plunger and I obtain a full bearing for the wedge where it acts against the plunger guide.

To prevent the screw ring rotating in the sleeve I provide a set screw or like element 22 which will fit loosely in the slot in the threaded ring so as to prevent its rotation while permitting sufficient contraction to allow it to grip the work responsive to the coaction of the wedge faces. In this way the wrench or tool can be applied to the sleeve for screwing the assembled device to the work.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. In a device of the character described, a sleeve having threads at one end and an internal bevelled surface near the other end, a compressible ring internally threaded and adapted to screw on the work, said ring having a bevelled surface adapted to co-act with the bevelled surface of the sleeve, an element adapted to screw into the sleeve and to engage and compress said ring, and a wedge mounted in said element with an end exposed for a driving blow, there being a support for the work and said wedge being adapted to act between the element and the work support so that when driven in it will not act simultaneously to jar the work from its support and to increase the compression of said threaded ring.

2. A device as described in claim 1, in which a loose plunger is interposed between the wedge and the work surface so as to transmit the thrust axially to the work support.

3. In a device of the character described, a sleeve having an internal bevelled face near one end, a split ring internally threaded and adapted to screw on the work and having a bevelled face adapted to engage said bevelled seat, means screwed into said sleeve carrying a plunger movable in line with the axis of the sleeve and adapted to engage the work, and a transversely movable wedge in the sleeve with an end exposed to permit it to be driven in by impact to force said plunger to its work simultaneously to contract the split ring as the device is forced away from the work.

4. In a device of the character described, a sleeve having an internal bevelled face near one end, a split ring internally threaded and adapted to screw on the work and having a bevelled face adapted to engage said bevelled seat, means screwed into said sleeve carrying a plunger movable in line with the axis of the sleeve and adapted to engage the work, and a transversely movable wedge in the sleeve with an end exposed to permit it to be driven in by impact to force said plunger to its work and simultaneously to contract the split ring as the device is forced away from the work, said element comprising an externally threaded portion adapted to be screwed into the sleeve so as to apply initial compression on the split ring to force it into threaded engagement with the work, the expanded split ring having a slightly larger diameter than that which would be standard for threaded engagement with the work.

In testimony whereof I affix my signature.

PERCY C. GROVER.

CERTIFICATE OF CORRECTION.

Patent No. 1,590,973. Granted June 29, 1926, to

PERCY C. GROVER.

It is hereby certified that error appears in the printed specification of the above numbered patent requiring correction as follows: Page 2, line 71, claim 1, strike out the word "not"; and that the said Letters Patent should be read with this correction therein that the same may conform to the record of the case in the Patent Office.

Signed and sealed this 6th day of October, A. D. 1931.

(Seal)

M. J. Moore,
Acting Commissioner of Patents.